March 12, 1963     A. TANTILLO ET AL     3,081,397

BATHROOM CABINET

Filed Sept. 2, 1960     3 Sheets-Sheet 1

INVENTORS
Alfred Tantillo
John Nelson
BY
Julius L. Rubinstein
Attorney

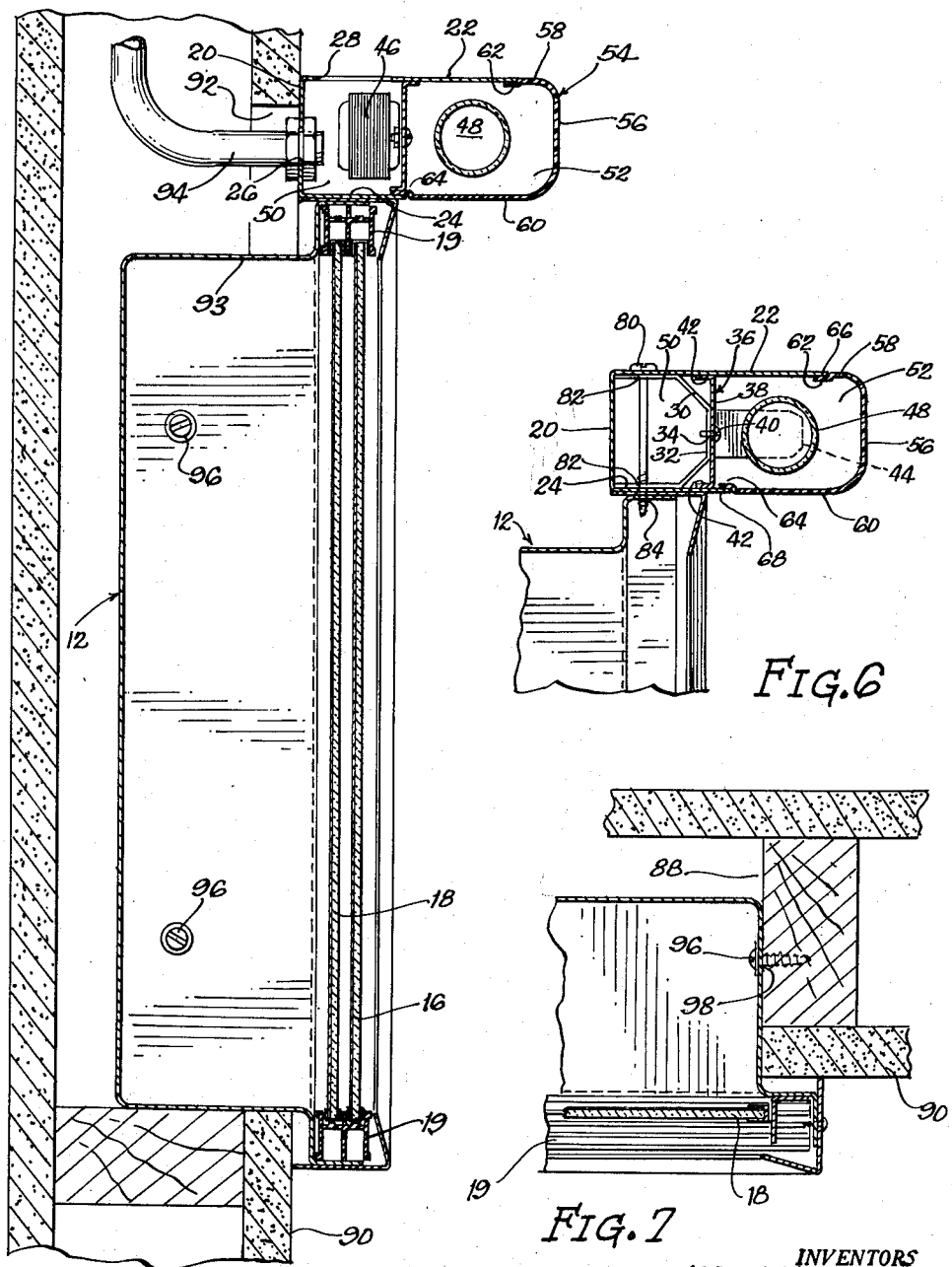

United States Patent Office 3,081,397
Patented Mar. 12, 1963

3,081,397
BATHROOM CABINET
Alfred Tantillo and John Nelson, Chicago, Ill., assignors to General Bathroom Products Corp., Chicago, Ill.
Filed Sept. 2, 1960, Ser. No. 53,729
8 Claims. (Cl. 240—4.1)

This invention relates to bathroom fixtures and more particularly to an illuminated bathroom cabinet.

Housings of bathroom cabinets are usually made of sheet metal and have the appearance of a rectangular open faced box. The housings are normally mounted in a generally rectangular recess in a wall of the bathroom. Heretofore, each illuminated bathroom cabinet was provided with a junction box mounted on the top surface. This junction box was provided with an opening in which a B-X or thin walled tube containing the power lines was mounted.

This arrangement was not very satisfactory from an installation standpoint, because when the housing of the cabinet was placed in the recess, the junction box was well inside the recess and inaccessible. Consequently, the B-X or thin walled cable had to be attached to the junction box before the housing was mounted in the recess. This required the services of an extra man to hold the cabinet housing close to the recess while the electrician connected the B-X cable to the junction box and attached the power lines therein to the wires leading to the light fixture and switch. This use of an extra man increases the expense of installation to an objectionable extent.

What is needed therefore and comprises an important object of this invention is to provide a bathroom cabinet which can be installed and connected by only one man.

Another object of this invention is to provide an illuminated bathroom cabinet which does not require a junction box and an access opening to the cabinet housing.

This and other objects of this invention will become more apparent when read in the light of the accompanying drawings and specification wherein:

FIG. 5 is a sectional view taken along line 5—5 of FIG. 1, but with the access opening cover removed;

FIG. 6 is a sectional view taken on the line 6—6 of FIG. 1;

FIG. 7 is a sectional view taken on the line 7—7 of FIG. 1;

Figure 1:
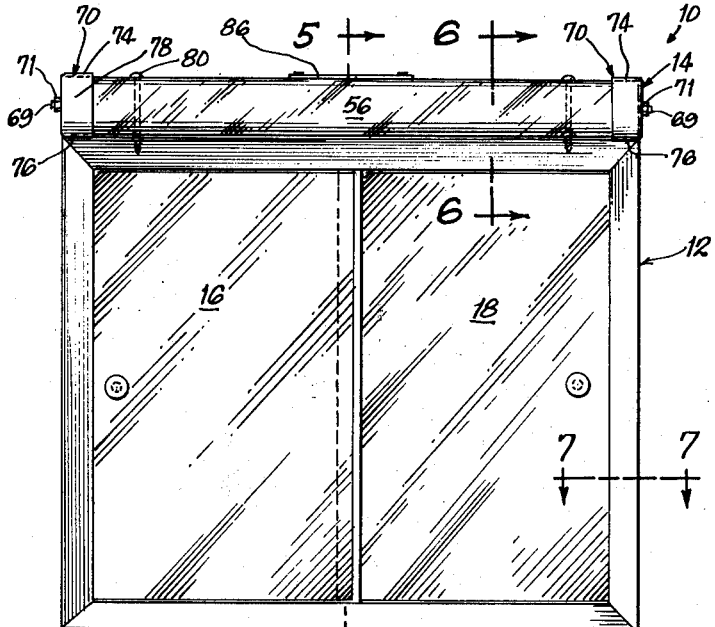
FIGURE 1 is a front elevational view of the improved illuminated bathroom cabinet.
Figure 2:
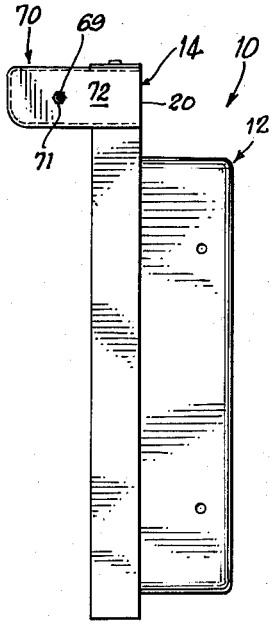
FIG. 2 is a side elevational view of the bathroom cabinet shown in FIG. 1.

Referring now to FIGS. 1 and 2 of the drawing, an illuminated bathroom cabinet indicated generally by the reference numeral 10 comprises a cabinet housing 12 and an attached light fixture housing 14. The cabinet housing 12 is preferably made of sheet metal and has the appearance of a rectangular open faced box. Mirrored closures 16 and 18 slide in tracks 19 so that the cabinet housing can be opened and closed in a manner well known in the art, see FIG. 5.

The light fixture housing 14 includes a rear wall 20 adapted to engage the wall of the bathroom, see FIG. 5. The top and bottom edges of the rear wall 20 are bent to form generally forwardly extending top and bottom walls 22 and 24, see FIG. 6. As seen, the top wall 22 extends further forwardly than the bottom wall 24 for reasons to become apparent below.

Figure 3:
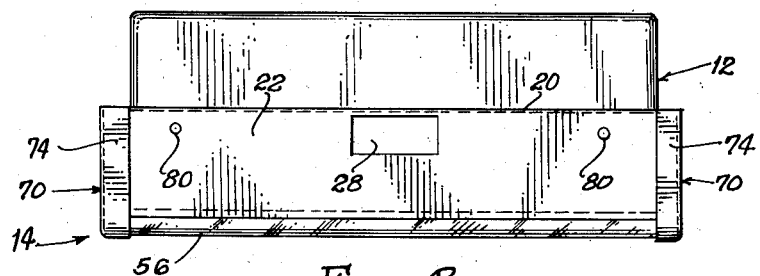
FIG. 3 is a plan view of the improved illuminated bathroom cabinet but with the access opening cover removed.
Figure 4:
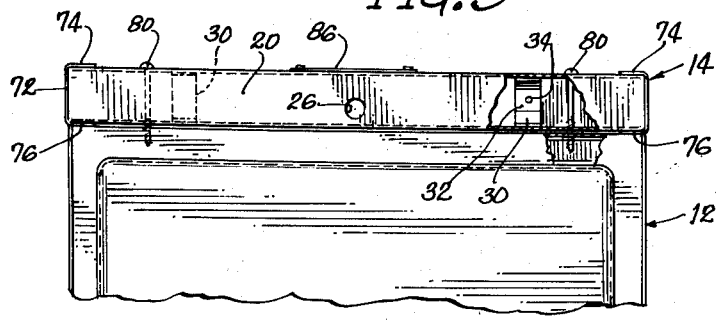
FIG. 4 is a rear elevational view of the upper portion of the illuminated bathroom cabinet with parts broken away to better show how the light fixture is attached to the bathroom cabinet housing.

A cable receiving opening 26 is formed in rear wall 20, see FIGS. 4 and 6, and an enlarged access opening 28 is formed in top wall 22 adjacent to and above the opening of the rear wall, see FIGS. 3 and 5.

Figure 8:
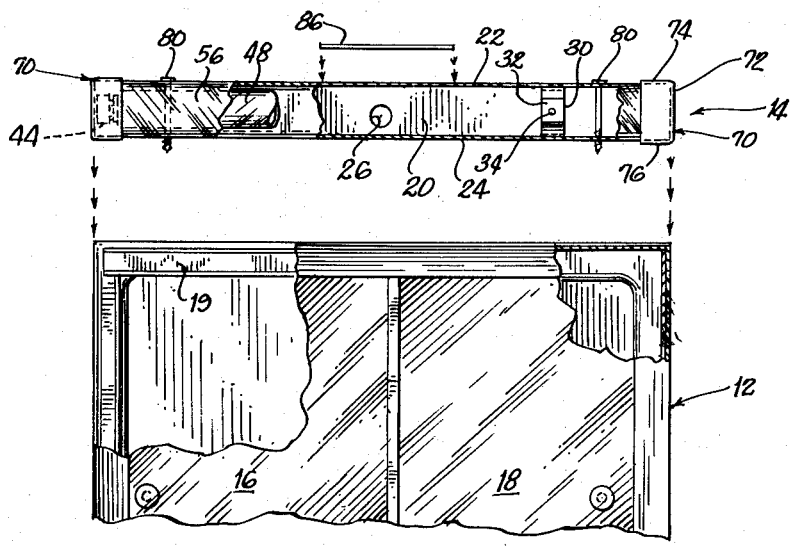
FIG. 8 is a fragmentary front elevational view of the bathroom cabinet with the light fixture housing shown separately above it.

Spaced parallel brackets 30 are secured to the top and bottom walls of the light fixture housing, as shown in FIGS. 4, 6 and 8. These brackets have a surface 32 which is parallel to rear wall 20 and a bolt receiving opening 34 extends through this surface, see FIG. 6. A straight generally channel shaped support member 36 is mounted on these brackets with the web 38 mounted on bracket surface 32 by bolts 40, and positioned thereby in spaced parallel relation to rear wall 20. The opposed legs 42 of support 36 engage the inner surfaces of the top and bottom walls 22 and 24, see FIG. 6. This arrangement gives support 36 a combination of functions. First of all the engagement of legs 42 with the upper and lower housing walls 22 and 24 strengthens the light fixture housing 14. In addition, as shown in FIGS. 5, 6, and 8, the fluorescent light sockets 44, ballast 46 and fluorescent lamp 48 are all supported by support 36. Furthermore, web 38 of the support 36 divides the light fixture housing into an elongated roomy wireway section 50 and a lamp section 52, see FIGS. 5 and 6.

A translucent closure member 54 is provided. This closure member may be formed from glass or some suitable plastic and includes a front wall 56 and rearwardly extending top and bottom walls 58 and 60. As seen in FIG. 6, the closure bottom wall 60 extends further rearwardly than the closure top wall 68. In addition, the rear edge portions 62 and 64 of the top and bottoms walls 58 and 60 are inwardly offset to provide seats for engaging the forward edges 66 and 68 of the top and bottom walls 22 and 24 of the light fixture housing 14. With this arrangement when a fluorescent lamp is lit in the light fixture housing 14, light will pass through the transparent closure member 54 forward and downwardly from the light fixture to provide good illumination for a person viewing himself in the mirrored closures.

The light fixture housing is provided with end walls (not shown), with an outwardly projecting bolt 69 attached thereto. The end walls and bolts 69 provide a means for seating and attaching decorative end plates 70 on the sides of the light fixture housing 14, see FIGS. 1 and 2. Each end plate comprises a generally planar wall portion 72 with a bolt receiving opening extending therethrough. As seen in FIG. 2, each end plate may be locked on the end walls of the light fixture housing by passing the bolt 69 through this opening and attaching it by means of a suitable nut 71, see FIG. 1.

The end plates are provided with top, bottom, and front inwardly extending lateral flanges 74, 76, and 78, see FIGS. 1, 3, and 4. These lateral flanges embrace the lateral edges of the top and bottom walls of the light fixture housing 14 and the translucent closure member 54, and in addition they embrace the lateral edges of the front wall 56 of the translucent closure member 54 to removably lock the member 54 in position, see FIG. 5.

It is apparent that the light fixture housing 14 is removably attached to the cabinet housing 12 by means of screws 80 which extend through aligned openings 82 in the top and bottom walls 22 and 24 and openings 84 in the cabinet housing 12, see FIGS. 4, 6, and 8. In addition, a removable closure 86 is attached to the top wall 22 of the light fixture housing 14 covering the access opening 28 after installation of the bathroom cabinet is completed.

Figure 9:
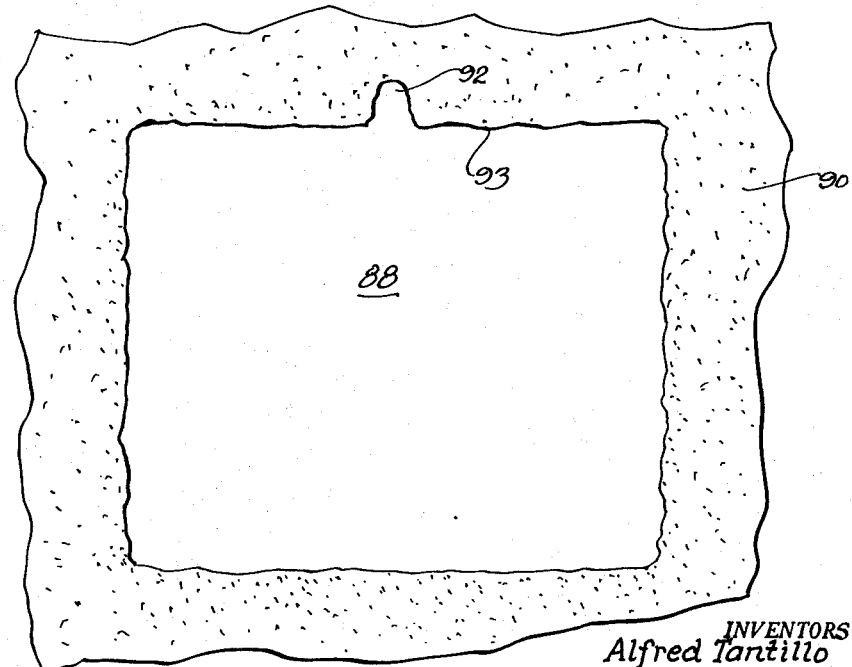
FIG. 9 is a front elevational view of the wall recess into which the bathroom cabinet is fitted.

To install the bathroom cabinet, it is only necessary to form a generally rectangular hole or recess 88 in the bathroom wall 90. This hole is provided with a small recess or groove 92 formed in its upper wall 93, see FIG. 9. The B-X or thin walled cable 94 containing the power lines is pulled through or inserted in groove 92 so one end projects out beyond the wall, see FIG. 5. Next the cabinet housing 12 is placed in recess 88 far enough so that the cabinet 10 is primarily supported therein. After this, the end of the B-X or thin walled cable is inserted in opening 26 and is locked therein by means of suitable connectors in a manner well known in the art. It is noted, however, that the access opening in the top wall 22 simplifies the connection and permits the connection to be made after the light fixture is completely assembled and wired. In addition, this arragement makes it easy for the installer to connect the power lines in the cable to the wires in the light fixture housing. After this the closure 86 is mounted over the access opening 28 and then the cabinet housing 12 is permanently mounted in the recess 88 by means of screws 96 which extend through screw receiving openings 98 in the sides of the cabinet housing and into the sides of the recess 88, see FIG. 7.

It is apparent that the above described operations can be quickly and easily performed by only one man. Obviously many modifications and variations of the present invention are possible in the light of the above teachings. It is therefore to be understood that the invention may be practiced otherwise than as specifically described and still remain within the scope of the appended claims.

What is claimed is:

1. A light fixture for attachment to a bathroom cabinet comprising a housing, said housing having a rear wall for engaging the walls of a bathroom and for attachment thereto and having generally forwardly extending top and bottom walls, said top wall extending further forwardly than the bottom wall, a cable receiving opening formed in said rear wall for attachment of a cable thereto and an enlarged access opening formed in the top wall adjacent to and above the opening in the rear wall, combined means in said housing for strengthening the housing, for holding light sockets and lamps thereon, and for dividing the housing into a wireway section and a lamp section, a translucent closure member comprising a front wall and rearwardly extending top and bottom walls, said closure bottom wall extending further rearwardly than the top closure wall, means on the rear edges of the top and bottom closure walls for engaging the forward edges of the top and bottom fixture housing walls and being seated thereby, and means mounted on said housing and engaging a portion of said closure member for holding the closure member on said light fixture housing whereby when a lamp is mounted and lit on the housing, the light will pass through the translucent closure member forwardly and downwardly from the light fixture housing.

2. The light fixture housing described in claim 1 wherein said means for holding the translucent closure member on said light fixture housing comprises a pair of end plates, said end plates having inwardly extending top, front and bottom lateral flanges, said end plates mounted on the opposite sides of the light fixture housing with the top, front, and bottom lateral flanges embracing the lateral edges of the top and bottom surfaces of both the light fixture housing and the closure member, and embracing the lateral edges of the front wall of the translucent closure member.

3. A light fixture for attachment to a bathroom cabinet comprising a housing, said housing having a rear wall for engaging the wall of a bathroom and for attachment thereto and having generally forwardly extending top and bottom walls, said top wall extending further forwardly than the bottom wall, a cable receiving opening formed in said rear wall for attachment of a cable thereto and an enlarged access opening formed in the top wall adjacent to and above the opening in the rear wall, bracket members mounted in the light fixture housing, a straight channel shaped support mounted on said bracket member, the web of said support held in spaced parallel relation to the rear wall dividing the housing in a wireway section and a lamp section, the legs of said channel shaped support engaging the top and bottom walls of the fixture housing to strengthen it, fluorescent lamp sockets mounted on said channel shaped support, a translucent closure member comprising a front wall and rearwardly extending top and bottom walls, said closure bottom wall extending further rearwardly than the closure top wall, the rear edges of the top and bottom closure walls inwardly offset to provide seats for engaging the forward edges of the top and bottom walls of the light fixture housing, and a pair of end plates, said end plates having inwardly extending top, bottom, and front flanges, said end plates mounted on the opposite sides of the light fixture housing with said top, bottom and front lateral flanges embracing the lateral edges of the top and bottom surface of both the light fixture housing and the translucent closure member and embracing the lateral edges of the front wall of the closure member.

4. The fixture described in claim 3 including a removable closure covering said enlarged access opening in the top wall of said light fixture housing.

5. An illuminated bathroom cabinet comprising in combination a cabinet housing and a light fixture removably attached to an external surface of the cabinet housing, said light fixture comprising a housing having a rear wall adapted to engage the wall of a bathroom and generally forwardly extending top and bottom walls, said top wall extending further forwardly than the bottom wall, a cable receiving opening formed in said rear wall for attachment of a cable thereto and an enlarged access opening formed in the top wall adjacent to and above the opening in the rear wall, an elongated support member mounted in said light fixture housing in spaced generally parallel relation to the rear wall and defining a wireway therebetween, and sockets mounted on said support member for holding lamps thereon, a translucent closure member comprising a front wall and rearwardly extending top and bottom walls, said closure bottom wall extending further rearwardly than the closure top wall, means on the rear edges of the top and bottom closure walls for engaging the forward edges of the top and bottom fixture housing walls and being seated thereby, and means mounted on said housing and engaging a portion of said closure member for holding the translucent closure member on said light fixture housing whereby when a lamp is mounted and lit in the light fixture housing, light will pass through the closure member forwardly and downwardly from the light fixture housing.

6. The bathroom cabinet described in claim 5 wherein said means for holding the translucent closure member on the light fixture housing comprises a pair of end plates, said end plates having inwardly extending top, front, and bottom lateral flanges, said end plates mounted on the opposite sides of the light fixture housing with said top, front, and bottom lateral flanges embracing top lateral edges and bottom surface of both the light fixture housing and the translucent closure member, and embracing the lateral edges of the front wall of the translucent closure member.

7. An illuminated bathroom cabinet comprising in combination a cabinet housing and a light fixture removably attached to an external surface of the cabinet housing, said light fixture comprising a housing having a rear wall adapted to engage the wall of a room and generally forwardly extending top and bottom walls, said top wall extending further forwardly than the bottom wall, a cable receiving opening formed in said rear wall for attachment of a cable thereto and an enlarged access opening formed in the top wall adjacent to and above the opening in the rear wall, bracket members mounted in the light fixture housing, a straight channel shaped support mounted on said bracket members, the web of said support held in spaced parallel relation to the rear wall defining a wireway therebetween, the legs of said channel shaped support engaging the top and bottom walls of the fixture housing to strengthen the light fixture housing, fluorescent lamp sockets mounted on said channel shaped support, a translucent closure member comprising a front wall and rearwardly extending top and bottom walls, said closure bottom wall extending further rearwardly than the closure top wall, the rear edge portions of the top and bottom closure walls inwardly offset to provide seats for engaging the forward edges of the top and bottom walls of the light fixture housing, and a pair of end plates, said end plates having inwardly extending top, bottom and front lateral flanges, said end plates mounted on the opposite sides of the light fixture housing with said top, bottom and front lateral flanges embracing the lateral edges of the top and bottom walls of both the light fixture housing and the closure member, and embracing the lateral edges of the front wall of the closure member.

8. The bathroom cabinet described in claim 7 including a removable closure covering said enlarged access opening in the top wall of the light fixture housing.

References Cited in the file of this patent
UNITED STATES PATENTS

| | | |
|---|---|---|
| 1,856,590 | Pfeiffer | May 3, 1932 |
| 2,556,870 | Clark | June 12, 1951 |
| 2,678,252 | Swearingen | May 11, 1954 |
| 2,694,775 | Florence | Nov. 16, 1954 |
| 2,893,148 | Figman | July 7, 1959 |
| 3,014,126 | Endelson | Dec. 16, 1961 |